US012799684B2

(12) United States Patent
Demond et al.

(10) Patent No.: US 12,799,684 B2
(45) Date of Patent: Nov. 17, 2026

(54) ASSEMBLY AND METHOD FOR AUTOMATIC ALIGNING OF RAILS

(71) Applicant: Pandrol, Raismes (FR)

(72) Inventors: Nicolas Demond, Marcq en Baroeuil (FR); Imad Errabie, Valenciennes (FR)

(73) Assignee: Pandrol, Raismes (FR)

( * ) Notice: Subject to any disclaimer, the term of this patent is extended or adjusted under 35 U.S.C. 154(b) by 655 days.

(21) Appl. No.: 18/272,871

(22) PCT Filed: Jan. 18, 2022

(86) PCT No.: PCT/FR2022/050098
§ 371 (c)(1),
(2) Date: Jul. 18, 2023

(87) PCT Pub. No.: WO2022/157449
PCT Pub. Date: Jul. 28, 2022

(65) Prior Publication Data

US 2024/0084519 A1 Mar. 14, 2024

(30) Foreign Application Priority Data

Jan. 19, 2021 (FR) ...................................... 2100487

(51) Int. Cl.
*E01B 29/46* (2006.01)
*B23K 37/04* (2006.01)
(Continued)

(52) U.S. Cl.
CPC .......... *E01B 29/46* (2013.01); *B23K 37/0452* (2013.01); *B23K 37/047* (2013.01); *E01B 35/00* (2013.01); *B23K 2101/26* (2018.08)

(58) Field of Classification Search
CPC .......... E01B 29/46; E01B 29/44; E01B 29/04; E01B 2203/16; E01B 35/00; B23K 2101/26; B23K 37/0452; B23K 37/047
See application file for complete search history.

(56) References Cited

U.S. PATENT DOCUMENTS 4,641,818 A * 2/1987 Bommart ................ E01B 29/46 228/49.1
4,645,897 A * 2/1987 Gourlay ............. B23K 11/0073 219/104

(Continued)

FOREIGN PATENT DOCUMENTS

AT 516827 B1 * 9/2016 ............. E01B 27/17
CN 102493295 A 6/2012

(Continued)

OTHER PUBLICATIONS

French Preliminary Search Report for Application No. FR 2100487 dated Sep. 18, 2021, 2 pages. [See p. 1, categorizing the cited references].

(Continued)

*Primary Examiner* — Cheng Lin
(74) *Attorney, Agent, or Firm* — Lerner David LLP

(57) ABSTRACT

The invention relates to an assembly for automatic aligning of rails, comprising: —a first alignment system (10) suitable for placing on a first track element (70) on a first rail (100); —a second alignment system (20) suitable for placing on a second track element (70) on a second rail (200); and —a system for acquiring a position (30), comprising at least one position sensor, wherein the first alignment system (10) and/or the second alignment system (20) comprises an actuating system (51, 52) suitable for automatically adjusting a position of the first rail (100) and/or of the second rail (200) on the basis of a position measured by the acquisition system (30).

16 Claims, 11 Drawing Sheets

(51) Int. Cl.

| | |
|---|---|
| ***B23K 37/047*** | (2006.01) |
| ***E01B 35/00*** | (2006.01) |
| *B23K 101/26* | (2006.01) |

(56) References Cited

U.S. PATENT DOCUMENTS

| | | | | | |
|---|---|---|---|---|---|
| 4,716,836 | A * | 1/1988 | Hardt | E01B 29/46 269/46 |
| 4,753,424 | A * | 6/1988 | Sato | B23K 11/0073 269/156 |
| 5,575,416 | A * | 11/1996 | Oellerer | E01B 29/46 228/49.1 |
| 6,385,861 | B1 * | 5/2002 | Blackwell | E01B 29/46 104/2 |
| 6,651,353 | B1 * | 11/2003 | Evans | E01B 29/46 104/2 |
| 6,762,390 | B2 * | 7/2004 | Theurer | B23K 37/0443 219/53 |
| 8,684,279 | B1 * | 4/2014 | Bledsoe | E01B 29/16 104/2 |
| 10,053,819 | B2 * | 8/2018 | Lewis | E01B 29/20 |
| 2019/0330805 | A1 | 10/2019 | Birks et al. | |

FOREIGN PATENT DOCUMENTS

| | | | | |
|---|---|---|---|---|
| DE | 102004005840 B4 * | 12/2005 | E01B 33/02 |
| EP | 0253634 A2 | 1/1988 | |
| ES | 2326403 B2 * | 4/2010 | E01B 29/13 |
| FR | 2998310 A1 * | 5/2014 | E01B 29/46 |
| GB | 2510221 A | 7/2014 | |
| WO | WO-2020058208 A1 * | 3/2020 | B23K 13/015 |

OTHER PUBLICATIONS

International Search Report for Application No. PCT/FR2022/050098 mailed May 24, 2022, pp. 1-4. [See p. 2-3, categorizing the cited references].

Ceschia, K. et al., "Innovative Welding Processes for New Rail Infrastructures" WRIST—Grant Agreement 636164, Innovative Welding Processes for New Rail Infrastructures, Goldschmidt Group & Thermit Welding & European Commission, Prototype device for joint alignment, additional forging and enhanced cooling, with performance specifications and concept drawings, Aug. 2016, pp. 1-29.

Notice of opposition to a European patent Application No. 22705422.8, dated Jul. 21, 25, pp. 1-59.

* cited by examiner

ASSEMBLY AND METHOD FOR AUTOMATIC ALIGNING OF RAILS

CROSS-REFERENCE TO RELATED APPLICATIONS

The present application is a national phase entry under 35 U.S.C § 371 of International Application No. PCT/FR2022/050098 filed Jan. 18, 2022, which claims priority from French Patent Application No. 2100487, filed Jan. 19, 2021, all of which are hereby incorporated herein by reference.

FIELD OF THE INVENTION

The present invention relates to the field of systems for automatic aligning of railway rails, particularly for the purpose of their subsequent welding.

PRIOR ART

A railway comprises a plurality of rails arranged one after the other in a longitudinal direction. One rail must be aligned with an adjacent rail, particularly for the purpose of then carrying out its welding to the adjacent rail.

Current alignment machines allow carrying out the automatic aligning of two adjacent rails of a railway. These alignment machines also allow the subsequent welding of the rail to the adjacent rail, for example by means of flash welding.

Current alignment machines comprise a rigid frame designed to be positioned around the rails to be aligned, the frame comprising two opposite ends. Documents CN 102493295 A and U.S. Pat. No. 4,645,897 describe for example rail aligning and welding machines comprising frames of this type.

Attached to each end of the rail are gripping and actuation elements, each being designed to be attached to and to actuate one of the rails to be aligned.

The frame thus allows supplying a common positioning reference of the two rails relative to one another. The frame must have sufficient stiffness and be dimensioned to tolerate the consequent forces, so as to provide this common geometric reference between the two rails with sufficient accuracy.

In addition, it is necessary to retain a clear area at the space between the two rails to be aligned, for the purpose of then carrying out the welding of these two rails. Each of the two opposite ends of the frame being arranged at the corresponding rail, the two ends are separated by a minimum distance. The length of the frame is thus on the order of 3 meters or more.

In addition, these alignment machines necessitate the presence of a lifting arm designed to lift both the frame and the rails during their alignment and/or their welding. The lifting arm must be dimensioned to support the weight of the rails and of the frame during alignment, which increases the weight and the bulkiness of the alignment machine.

This great length of the frame, associated with the need for stiffness, imposes having a frame that is massive and heavy.

The presence of the frame and of the lifting arm thus increases substantially the weight and the bulkiness of the alignment machine. Current alignment machines are consequently heavy and bulky. Current alignment machines weigh several hundred kilograms and occupy a surface area on the ground of at least approximately 3 $m^2$.

Due to their great weight and bulkiness, current alignment machines must, to be moved on the railway, be transported on board a maintenance train, a backhoe, or a large-sized truck.

These transport constraints reduce the flexibility and increase the cost of rail aligning, and consequently the cost of carrying out the welding of rails.

FIGS. 1*a* and 1*b* illustrate an example of an alignment machine of the existing type. The alignment machine is transported in a large-sized truck. The alignment machine comprises a frame 300, which is moved by a lifting arm 400. A gripping and actuation element 10', respectively 20' is attached to each end of the frame 300, each being designed to be attached to and actuate one of the two rails to be aligned 100, 200. An alignment machine of this type has the disadvantages mentioned above.

DISCLOSURE OF THE INVENTION

One object of the invention is to propose an assembly for automatic aligning of rails that is lighter and more compact than alignment assemblies known from the prior art.

According to a first aspect, the invention relates to an assembly for automatic aligning of rails, comprising:

- a first alignment system designed to be placed on a first track element at a first rail;
- a second alignment system designed to be placed on a second track element at a second rail; and
- a system for acquiring a position, comprising at least one position sensor of the first rail and/or of the second rail, in which the first alignment system comprises a first actuation system designed to adjust a position of the first rail depending on a position measured by the acquisition system and/or the second alignment system comprises a second actuating system designed to automatically adjust a position of the second rail depending on a position measured by the acquisition system.

Certain preferred but non-limiting features of the assembly for automatic aligning of rails described above are the following, taken individually or in combination:

- the system for acquiring a position is designed to measure a relative position of the first rail and of the second rail with respect to one another;
- each actuation system comprises at least one pair of actuation cylinders comprising two cylinders, each cylinder of the pair of actuation cylinders being designed to extend on a respective side of the rail, the position of which is to be adjusted, and to move said rail for the purpose of its alignment;
- each actuation system comprises a pair of cylinders for actuation in translation designed to move said rail in translation along a rail transverse direction and/or along a rail height direction;
- each of the two cylinders of the pair of cylinders for actuation in translation is designed to be positioned in contact with a rail head on a respective side of the rail head;
- each actuation system comprises a pair of cylinders for actuation in rotation designed to vary an inclination of said rail around a rail longitudinal direction;
- each alignment system comprises a single structure element appearing in the form of a rigid frame designed to extend on either side of the rail, the position of which is to be adjusted, in which each cylinder of the at least one pair of actuation cylinders is mounted on the single structure element;

each alignment system comprises two distinct structure elements, each structure element being designed to extend on a respective side of the rail, the position of which is to be adjusted, in which each cylinder of the at least one pair of actuation cylinders is mounted on a respective structure element;

each alignment system comprises at least one hook designed to be removably attached to at least one corresponding hook of the track element;

the at least one hook of the alignment system comprises a plate designed to be attached to a corresponding hook of the track element, said plate being adjustable depending on a type of said hook of the track element;

the track element is a track sleeper, and the plate comprises:

first means of attachment to a hook of the lag bolt type or of the threaded rod type of the track sleeper, second means of attachment to a hook of the clip type of the track sleeper, and third means of attachment to the alignment system.

According to a second aspect, the invention relates to a method for automatic aligning of rails by means of an assembly for automatic aligning of rails according to the first aspect, comprising the following steps:

placement of the first alignment system on the first track element;

placement of the second alignment system on the second track element;

acquisition of a position of the first rail and/or of the second rail by means of the system for acquiring a position;

automatic adjustment of a position of the first rail and/or of the second rail by means of the first actuation system and/or of the second actuation system, so as to align the first rail and the second rail.

DESCRIPTION OF THE FIGURES

Other features, objects and advantages of the present invention will appear upon reading the detailed description that follows, given by way of a non-limiting example, which will be illustrated by the following figures.

DETAILED DESCRIPTION OF THE INVENTION

Figure 1A:
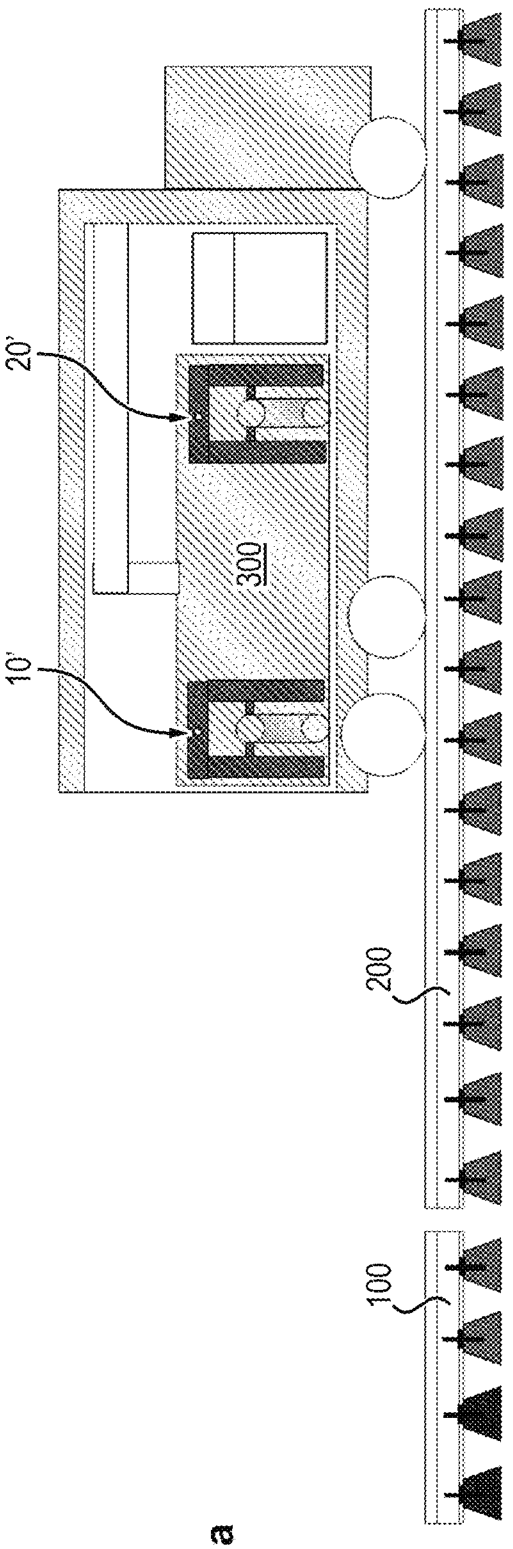
FIGS. 1*a* and 1*b*, already discussed, show schematic side views of a rail alignment system according to the prior art, respectively loaded in a transport truck and placed on the rails to be aligned.
Figure 1B:
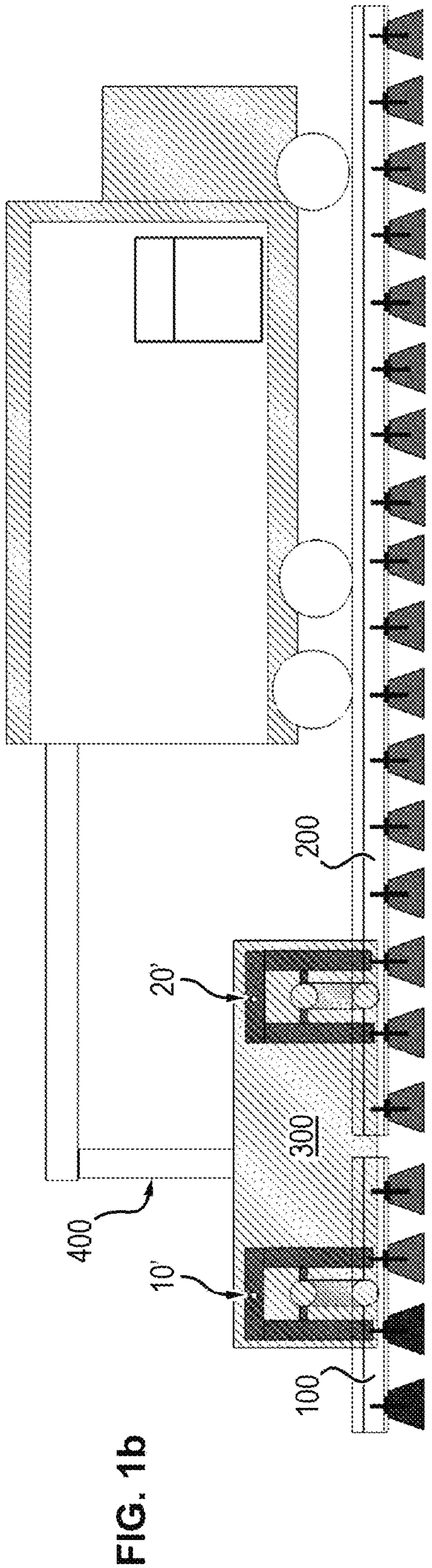
Figure 2A:
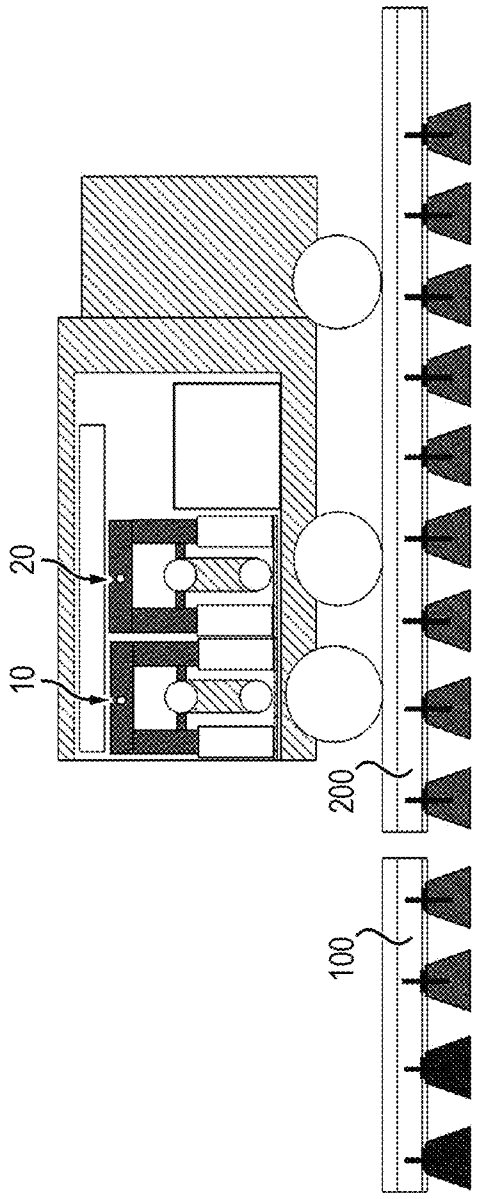
FIGS. 2*a* and 2*b*, already discussed, show schematic side views of an assembly for automatic aligning of rails according to one embodiment of the invention, respectively loaded in a transport truck and placed on the rails to be aligned.
Figure 2B:
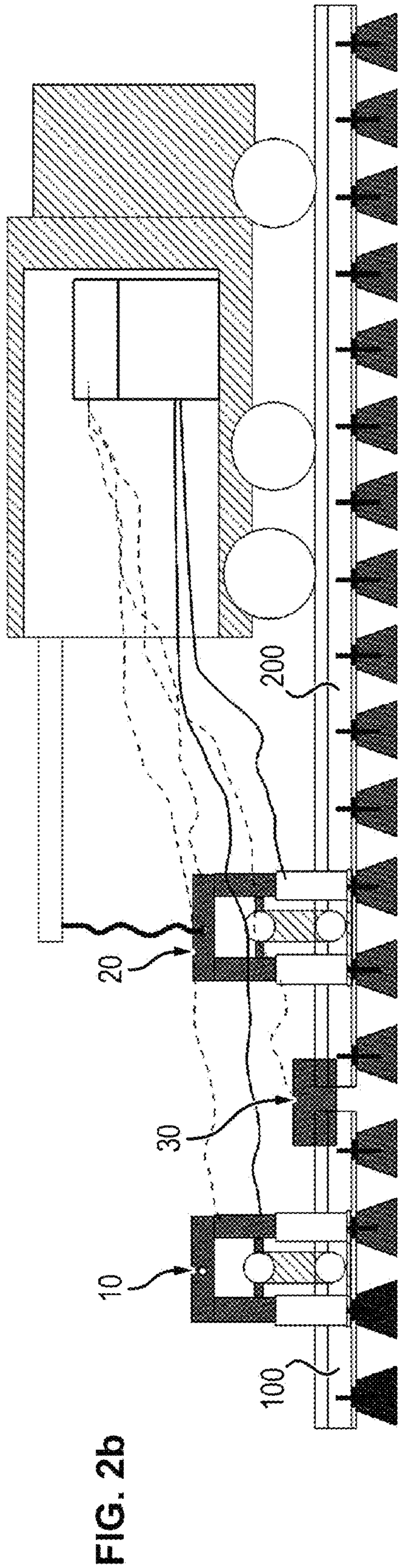

An assembly for the automatic aligning of rails is illustrated by way of a non-limiting example in FIGS. 2*a* and 2*b*.

The assembly for automatic aligning of rails comprises:

a first alignment system 10 designed to be placed on a first track element 70 at a first rail 100;

a second alignment system 20 designed to be placed on a second track element 70 at a second rail 200; and a system for acquiring a position 30, comprising at least one position sensor of the first rail 100 and/or of the second rail 200.

The first alignment system 10 comprises a first actuation system 51, 52 designed to automatically adjust a position of the first rail 100 depending on a position measured by the acquisition system 30. Alternatively or in addition, the second alignment system 20 comprises a second actuation system 51, 52 designed to automatically adjust a position of the second rail 200 depending on a position measured by the acquisition system 30.

The alignment systems 10, 20 can be placed on, for example removably attached to, laid on or wedged on track elements 70. Consequently, it is the track elements 70 which allow the placement of the alignment system 10, 20 relative to one another, thus supplying a common positioning reference of the two rails 100, 200 relative to one another. The positions of the alignment systems 10, 20 relative to one another are therefore fixed, without the alignment assembly necessitating a rigid frame to which the two alignment systems 10, 20 would be attached.

In addition, the alignment of the rails 100, 200 is accomplished automatically by the actuation systems 51, 52, depending on a position measured by the acquisition system 30. The actuation system 51, 52 thus automatically actuates the corresponding rail 100, 200 for the purpose of carrying out its alignment. Thus, it is not necessary to lift and move the rails 100, 200 throughout the alignment operation by means of a lifting arm, but simply to move the rail 100, 200 by means of the actuation system(s) 51, 52 depending on the measured position. As a result, the alignment assembly can dispense with the presence of a lifting arm.

The placement of the alignment systems 10, 20 on the track elements and the automatic aligning of the rails 100, 200 by means of the actuation systems 51, 52 allows Lightening and making more compact the alignment assembly compared with existing alignment assemblies.

The alignment assembly can therefore be transported on board a vehicle of smaller size than existing alignment assemblies. For example, it can be transported on board a small truck, or even be loaded on a lorry to be transported along the rails. The alignment assembly can also be unloaded and positioned around the rails 100, 200 to be aligned by an operator, due to its reduced weight. Thus, the transport constraints are reduced, which consequently increases the flexibility and reduces the cost of the operation of aligning rails.

Definitions

A rail 100, 200 extends in a substantially longitudinal direction X, which corresponds to a main direction of the rail.

A rail 100, 200 comprises a foot, a head, and a web designed to connecting the foot to the head. The head is opposite to the foot in a height direction Z of the rail which is substantially perpendicular to the longitudinal direction X. The head is located in a higher position than the foot of the rail 100, 200. A position in the direction of the height Z of the rail is called "pointu" in French.

The rail 100, 200 can be substantially symmetrical with respect to a plane of symmetry of the rail extending substantially in the longitudinal direction X and in the height direction Z and passing through a center of the rail 100, 200.

A transverse direction Y of the rail corresponds to a direction substantially perpendicular to the longitudinal direction X and to the height direction Z of the rail, i.e. to the plane of symmetry of the rail. The foot is designed to be laid on and attached to track elements 70, so that the sleepers 70 extend substantially in the transverse direction Y of the rail. A position in the transverse direction Y of the rail is called "tracé" in French.

An inclination of the rail 100, 200 around the longitudinal direction X of the rail is called inclination.

Two rails 100, 200 are aligned when their position in the height position, their position in the transverse position and their inclination are substantially identical. In other words, two rails 100, 200 are aligned when the have substantially the same inclination around the longitudinal direction X, the same position in the transverse direction Y, and when their dimension in the height direction Z corresponds to the same intended specific height position.

Two aligned rails 100, 200 can be spaced in the longitudinal direction X by a certain distance. The space present between the two rails 100, 200 allows carrying out the subsequent welding of the two rails 100, 200 together.

Acquisition System

The system for acquiring a position 30 is designed to measure a relative position of the first rail 100 and of the second rail 200 with respect to one another.

Figure 9A:
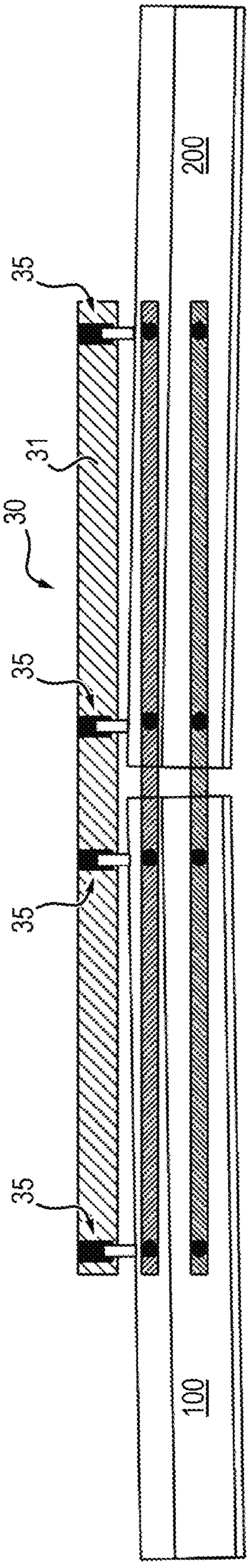
FIGS. 9*a* and 9*b* show respectively a schematic top view and a front view of a system for acquiring a position of an assembly for automatic aligning of rails according to one embodiment of the invention.
Figure 9B:
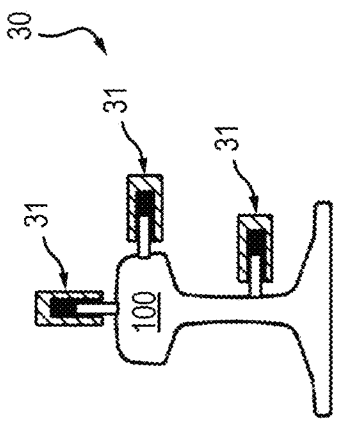
Figure 9C:
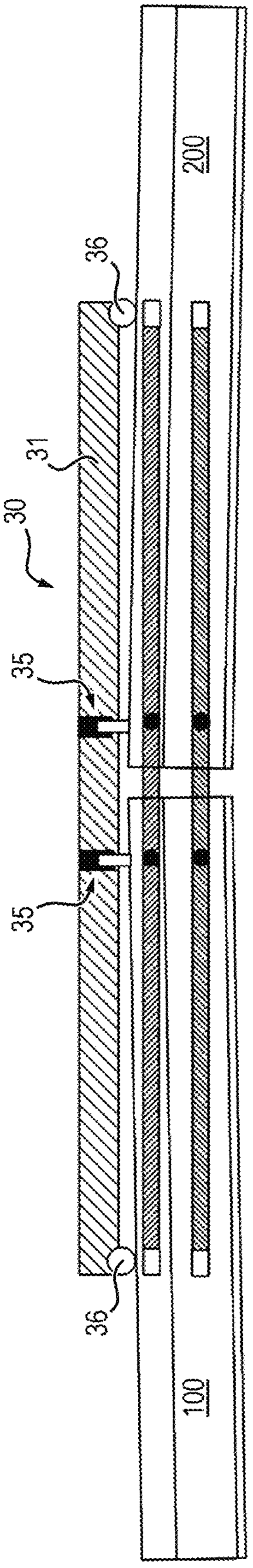
FIG. 9*c* shows a schematic top view of a system for acquiring a position of an assembly for automatic aligning of rails according to one embodiment of the invention.

The acquisition system 30 can comprise at least one ruler 31 designed to be positioned on each of the two rails 100, 200 to be aligned, as illustrated by way of a non-limiting example in FIGS. 9*a* to 9*c*. Each ruler 31 can be attached to both rails 100, 200 to be aligned.

Each ruler 31 comprises at least one pair of sensors 35 designed to measure a position of a rail 100, 200. A first sensor of the pair of sensors 35 is positioned at the first rail 100 and measures a position of the first rail 100, and a second sensor of the pair of sensors 35 is positioned at the second rail 200 and measures a position of the second rail 200. Each ruler 31 can be designed for measuring the height position and/or the transverse position and/or the inclination of each of the two rails 100, 200 to be aligned.

The height position can in particular be measured at a specific longitudinal distance from a position of the welding of the rails 100, 200, and correspond to a distance in the height direction Z between the top of the head of the rail 100, 200 and the ruler 31 for measuring the height position of the rail 100, 200. The height position can be on the order of a few millimeters.

For example, the system for acquiring a position 30 can comprise three rulers 31. FIG. 9*b* thus illustrates a non-limiting example of a first rail 100, on which are positioned three rulers 31 of the system for acquiring a position 30. A first ruler is designed to measure the height position, a second ruler is designed to measure the transverse position, and a third ruler is designed to measure the inclination of the first rail 100 to be aligned.

The alignment of the rails 100, 200 according to the position measured by a ruler 31 can be accomplished when the positions measured by the first and the second sensor of the same pair of sensors 35 of said ruler 31 are identical. More particularly, the alignment of the rails 100, 200 respectively in transverse position and in inclination can be accomplished when respectively the transverse position and the inclination measured by all the pairs of sensors of the respective rulers 31 for measuring the transverse position and the inclination are identical.

The alignment of the rails 100, 200 in height can be accomplished when the positions measured by the pairs of sensors of the ruler 71, designed to measure the height position, correspond to an intended height position, which can be selected by the welder. The intended height position can be 1.5 mm.

Each ruler 31 placed on two rails 100, 200 to be aligned can comprise two pairs of sensors 35, the acquisition system 30 thus comprising twelve sensors 35, as illustrated by way of a non-limiting example in FIG. 9*a*. Alignment according to the position measured by the ruler 31 is accomplished when the four sensors 35 of the ruler 31 measure an identical position.

As a alternative, each ruler 31 placed on two rails 100, 200 to be aligned can comprise a single pair of sensors 35, the acquisition system 30 comprising six sensors 35, as illustrated by way of a non-limiting example in FIG. 9*c*. This alternative has the advantage of simplifying the system by reducing the number of sensors. Each ruler 31 then additionally comprises two studs 36 with a fixed thickness. Zero-setting the ruler 31 is necessary for taking into account the height of the studs 36.

Alignment System

FIGS. 3*a* to 3*d*, 4*a*, 4*b*, 6*a* and 6*b* illustrate by way of a non-limiting example a first rail alignment system 10 arranged at a first rail 100. It is understood that the second alignment system 20 can be substantially identical to the first alignment system 10. Hereafter in the application, any description carried out in relation to the first alignment system 10 can apply in the same manner to the second alignment system 20.

The first alignment system 10 is designed to extend at a first rail 100, so as to adjust the position of the first rail 100. More particularly, the first alignment system 10 can be designed to extend on either side of the first rail 100, i.e. on one side and on the other of the first rail 100 in the transverse direction Y. Likewise, the second alignment system 20 can be designed to extend on either side of the second rail 200 in the transverse direction Y.

Each alignment system 10, 20 can have a respective plane of symmetry corresponding substantially to the plane of symmetry of the rail 100, 200 at which the alignment system 10, 20 is arranged and the position of which is to be adjusted. Thus, the plane of symmetry of the first alignment system 10 can correspond to the plane of symmetry of the first rail 100, and the plane of symmetry of the second alignment system 20 can correspond to the plane of symmetry of the second rail 200.

Each actuation system 51, 52 can comprise at least one pair of actuation cylinders 51, 52 comprising two cylinders. Each cylinder of the pair of actuation cylinders 51, 52 is designed to extend on a respective side of the rail 100, 200 the position of which is to be adjusted, and to move said rail 100, 200 for the purpose of its alignment.

In other words, the two cylinders of each pair of actuation cylinders 51, 52 are arranged on either side of the rail 100, 200 in the transverse direction Y.

Thus, each cylinder of the pair of actuation cylinders 51, 52 is able to enter into contact with the rail 100, 200 on either side of it, so as to form a rail 100, 200 clamp.

Each actuation system 51, 52 can comprise a pair of cylinders for actuation in translation 51 designed to move the rail 100, 200, the position of which is to be adjusted, in translation along the transverse direction Y of the rail and/or along the height direction Z of the rail.

Each of the two cylinders of the pair of cylinders for actuation in translation 51 can be designed to be positioned in contact with a head of the rail 100, 200 on a respective side of said head.

More particularly, each of the two cylinders for actuation in translation can be mounted on a structure element 53, 54 of the alignment system 10, 20 and be designed to extend from the structure element 53, 54 of the alignment system 10, 20 to a head of the corresponding rail 100, 200, so that an actuation of the cylinders for actuation in translation causes the application of a force on the head of the corresponding rail 100, 200.

More particularly, each of the two cylinders for actuation in translation can comprise a first end mounted on the structure element 53, 54 of the actuation system 51, 52 and a second end opposite to the first end. The second end is designed to come into contact with the head of the rail 100, 200, in particular in contact with a lower surface of the head, the head of the rail 100, 200 then resting substantially on the two cylinders. Each cylinder can be designed to extend substantially diagonally both in a transverse direction Y and in a height direction Z of the rail.

A similar and joint actuation of the two cylinders can allow regulating a height position of the rail 100, 200, i.e. actuating the rail 100, 200 in translation in the height direction Z. An opposite and joint actuation of the two cylinders can allow regulating a transverse position of the rail 100, 200, i.e. to actuate the rail 100, 200 in translation in the transverse direction Y.

For example, a simultaneous and equivalent increase in the stroke of each of the two cylinders allows pushing the head of the rail 100, 200 upward, and thus lifting the rail 100, 200 relative to the track in the height direction Z of the rail, i.e. increasing the height position of the rail 100, 200. Conversely, a simultaneous and equivalent reduction of the stroke of each of the two cylinders causes a downward movement of the rail 100, 200 under the influence of gravity, reducing the height position of the rail 100, 200.

A greater deployment of one of the two cylinders relative to the other allows moving the rail 100, 200 in the transverse direction Y on the side opposite to the cylinder with the greater deployment. In other words, an increase in the stroke of a single cylinder, which can be joined with a corresponding reduction in the stroke of the other cylinder, allows pushing the head of the rail 100, 200 from one side or from the other in the transverse direction Y of the rail, thus modifying the transverse position of the rail 100, 200.

Each actuation system 51, 52 can comprise a pair of cylinders for actuation in rotation 52 designed to vary an inclination of said rail 100, 200 around the longitudinal direction X of the rail.

Each of the two cylinders of the pair of cylinders for actuation in rotation 52 can be designed to be positioned in contact with a foot of the rail 100, 200 or of the web of the rail 100, 200, on a respective side of said foot or of said web.

More particularly, each of the two cylinders for actuation in rotation can be mounted on a structure element 53, 54 of the alignment system 10, 20 and be designed to extend from the structure element 53, 54 of the alignment system 10, 20 to a foot of the corresponding rail 100, 200 or to the web of the corresponding rail 100, 200, so that an actuation of the cylinders for actuation in rotation causes the application of a force on the foot or to the web of the corresponding rail 100, 200.

More particularly, each of the two cylinders for actuation in rotation can comprise a first end mounted on the structure element 53, 54 of the actuation system 51, 52 and a second end opposite to the first end.

The second end is designed to come into contact with the foot or the web of the rail 100, 200, in particular can be designed to come into contact with an upper surface of the foot when an alignment of the rail 100, 200 in inclination must be accomplished. Each cylinder can be designed to extend substantially diagonally both in a transverse direction Y and in a height direction Z of the rail.

An actuation of only one of the two cylinders can allow regulating an inclination of the rail 100, 200 relative to the longitudinal direction X.

An actuation system 51, 52 of this type, comprising a pair of cylinders for actuation in translation 51 and a pair of cylinders for actuation in rotation 52, allows simply regulating the alignment of the rail 100, 200 in height or transverse position and in inclination. The number of parts is reduced, and the alignment kinematics is simple.

Figure 3A:
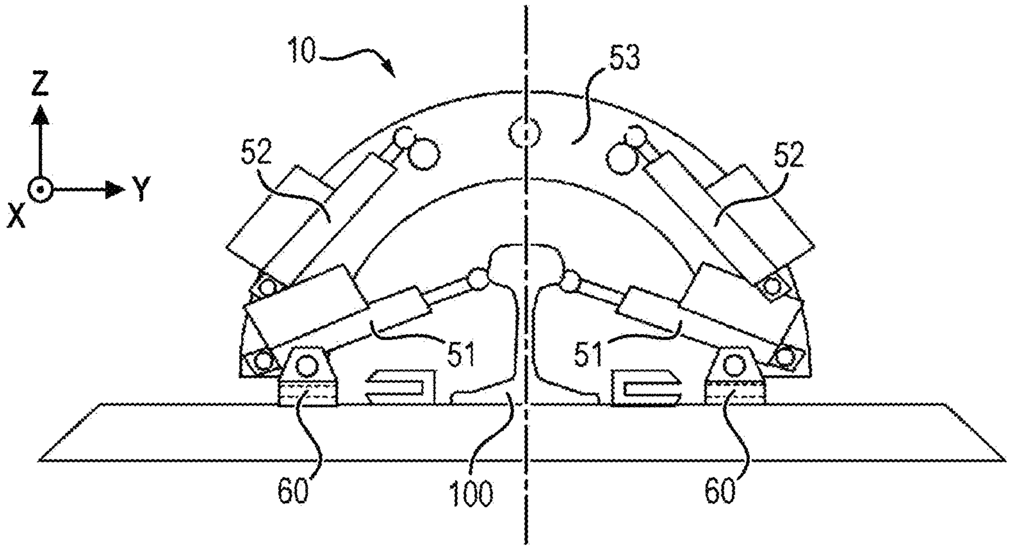
FIGS. 3*a* to 3*d* show schematic front views of an assembly for automatic aligning of rails according to one embodiment of the invention, in different positions of the actuation system corresponding to different positions and orientations of the corresponding rail.

By way of a non-limiting example, FIG. 3*a* illustrates a first actuation system 51, 52 arranged around the first rail 100 and placed on the track sleepers 70. The first actuation system 51, 52 comprises a pair of cylinders for actuation in translation 51 and a pair of cylinders for actuation in rotation 52. The two cylinders of the pair of actuation cylinders 51, 52 are retracted, so that the first rail 100 is not lifted, the first rail 100 being placed on the track sleepers 70. The first rail 100 is in a nominal position, i.e. has a nominal height, a normal transverse position and zero inclination.

Figure 3B:
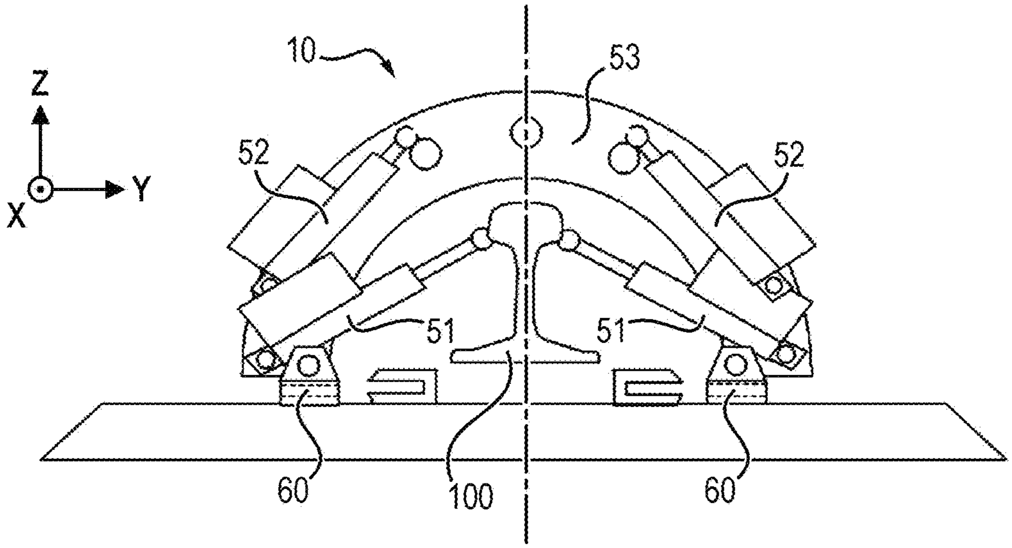

FIG. 3*b* illustrates an example of a first rail 100, of which the position in the height direction Z is modified relative to its nominal position by the two cylinders for actuation in translation of the first actuation system 51, 52. The two cylinders of the pair of actuation cylinders 51, 52 are deployed, so that the first rail 100 is lifted relative to the track, its height position being modified. The transverse position shown in FIG. 3*b* corresponds substantially to the nominal transverse position of the first rail 100, and the inclination of the first rail 100 is substantially zero.

Figure 3C:
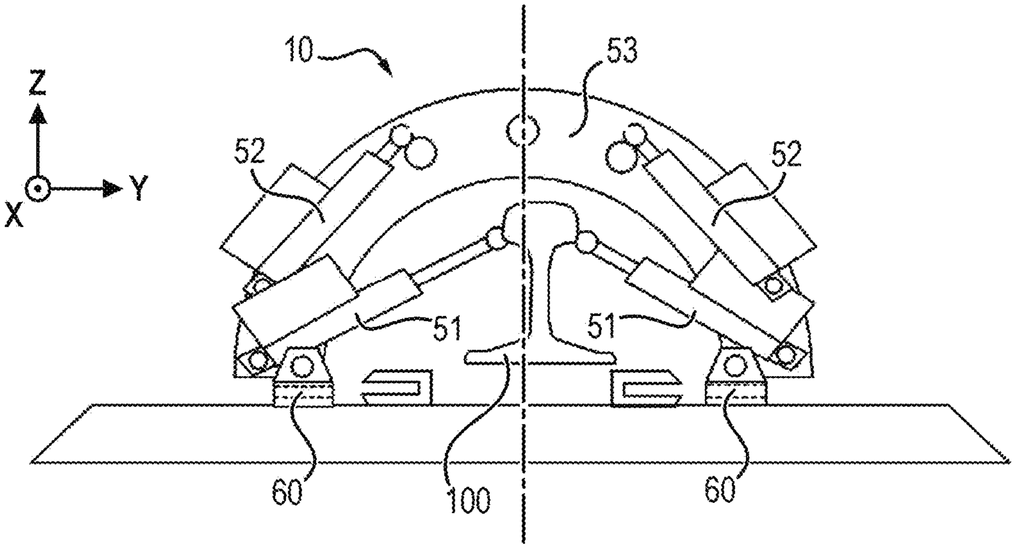

FIG. 3*c* illustrates an example of a first rail 100, of which the position in the transverse direction Y is modified relative to its nominal transverse position by the two cylinders for actuation in translation of the first actuation system 51, 52. One cylinder is more deployed that the other, so that the first rail 100 is moved on the side opposite to the cylinder that is the most deployed, its transverse position being modified. The height of the first rail 100 shown in FIG. 3*c* corresponds substantially to the height of the first rail 100 shown in FIG. 3*b*, and the inclination of the first rail 100 is substantially zero.

Figure 3D:
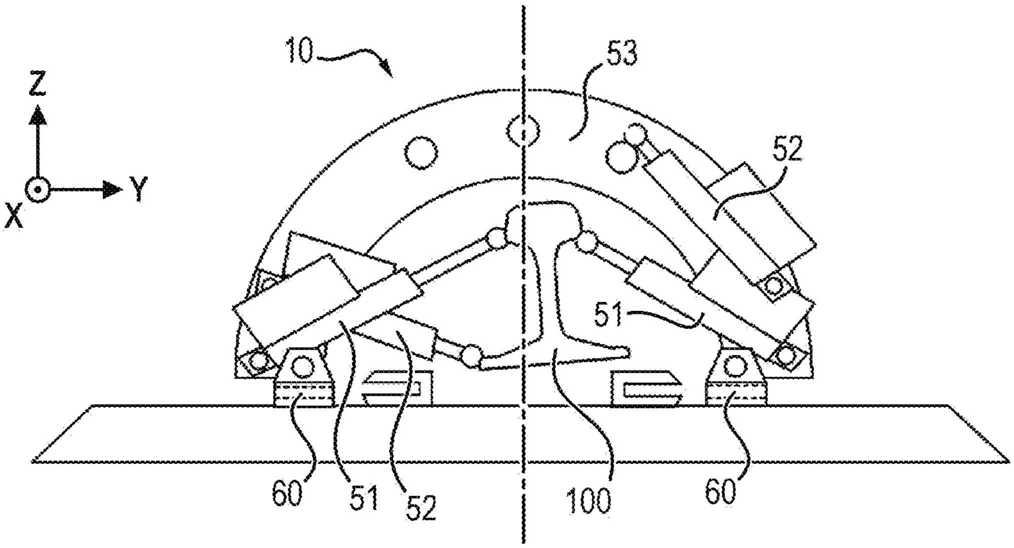
Figure 4A:
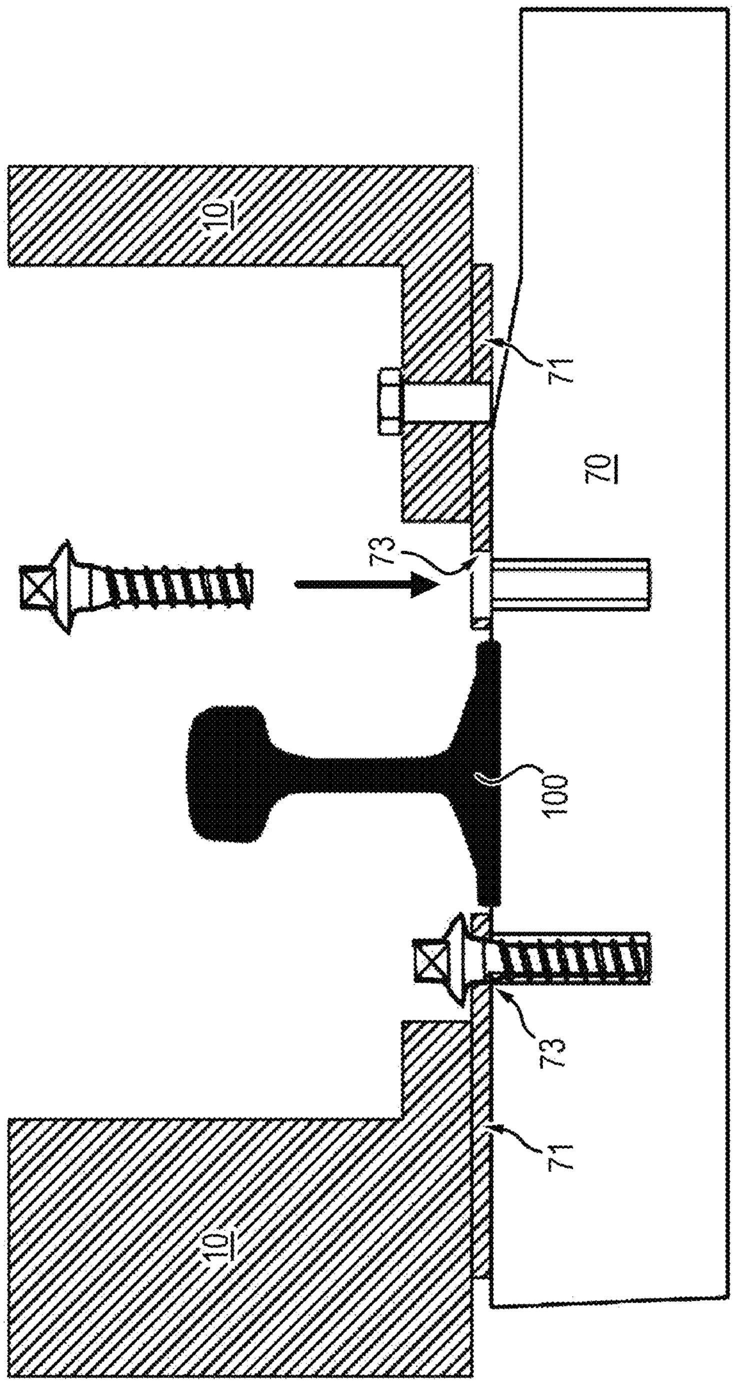
FIGS. 4*a* and 4*b* show schematic front views of an attachment of an assembly for automatic aligning of rails according to one embodiment of the invention respectively to a track sleeper hook of the lag bolt type and to a hook of the threaded rod type.
Figure 4B:
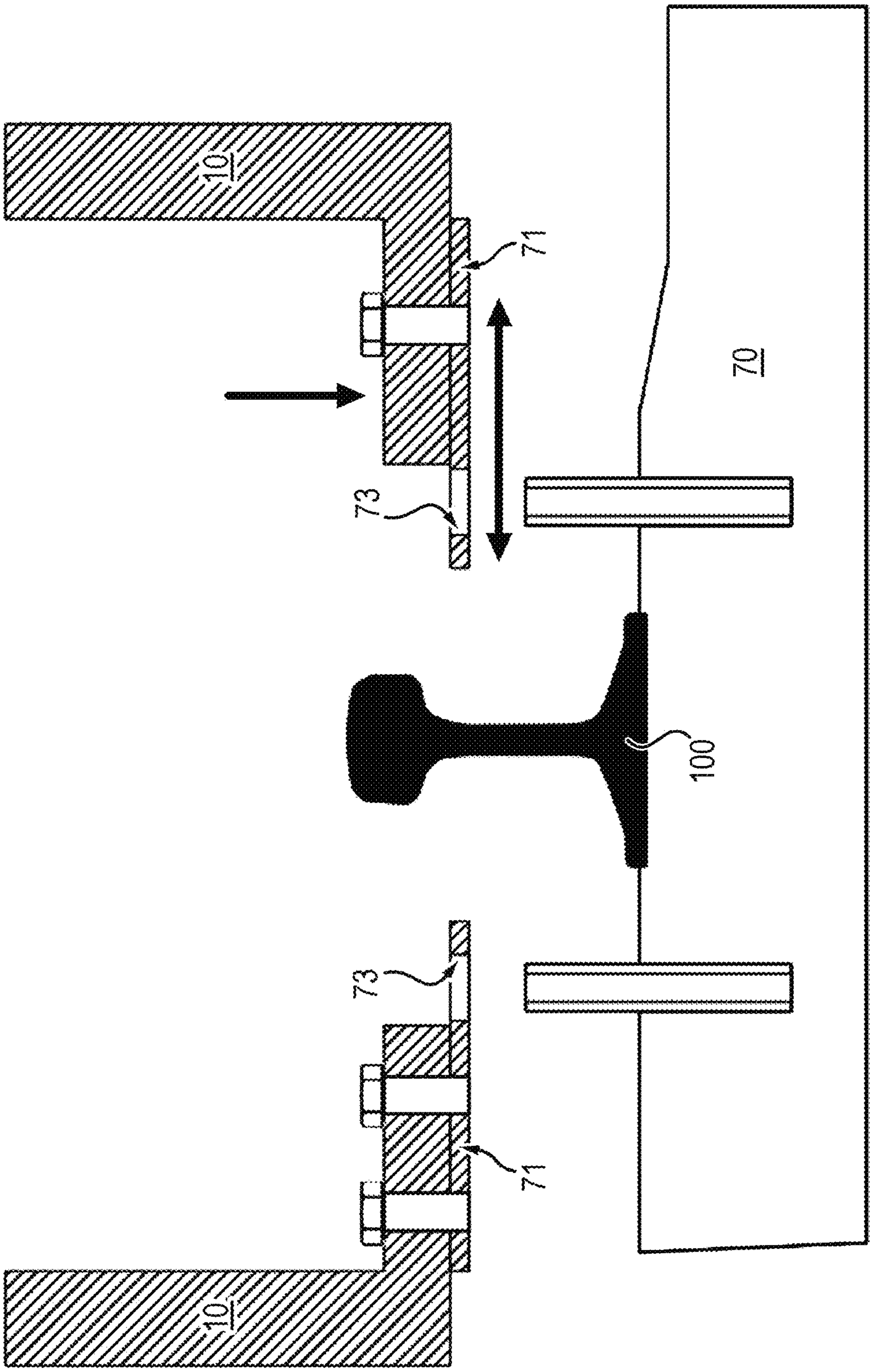

FIG. 3*d* illustrates an example of a first rail 100, the inclination of which relative to the longitudinal direction X is modified relative to the zero inclination by the two cylinders for actuation in translation of the first actuation system 51, 52. Only one of the two cylinders is deployed, so as to regulate the inclination of the first rail 100 relative to the longitudinal direction X. The height of the first rail 100 shown in FIG. 3*d* corresponds substantially to the height of the first rail 100 illustrated in FIG. 3*b*, the transverse position of the first rail 100 corresponds substantially to the nominal transverse position of the first rail 100.

In a first embodiment, illustrated by way of a non-limiting example in FIGS. 3*a* to 3*d*, 4*a*, 4*b* and 5*a* to 5*c*, each alignment system 10, 20 comprises a single structure element 53 in the form of a rigid frame designed to extend on either side of the rail 100, 200, the position of which is to be adjusted. Each cylinder of the at least one pair of actuation cylinders 51, 52 is mounted on the single structure element 53. The alignment assembly of this first embodiment has a reduced number of parts.

The rigid frame 53 can have substantially the shape of a half-circle, and be designed to be centered on the rail 100, 200 around which the alignment system 10, 20 is aligned. The cylinders of the pair of cylinders for actuation in translation 51 and/or of the pair of cylinders for actuation in rotation 52 can be mounted on a lower portion of each end of the half-circle of the rigid frame 53.

In a second embodiment, illustrated by way of a non-limiting example in FIGS. 6*a*, 6*b*, 7*a* and 7*b*, each alignment system 10, 20 comprises two distinct structure elements 54. Each structure element 54 is designed to extend on one respective side of the rail 100, 200 the position of which is to be adjusted. Each cylinder of the at least one pair of actuation cylinders 51, 52 is mounted on a respective structure element 54. The alignment assembly of this second embodiment has weight and bulkiness that are further reduced.

Figure 8:
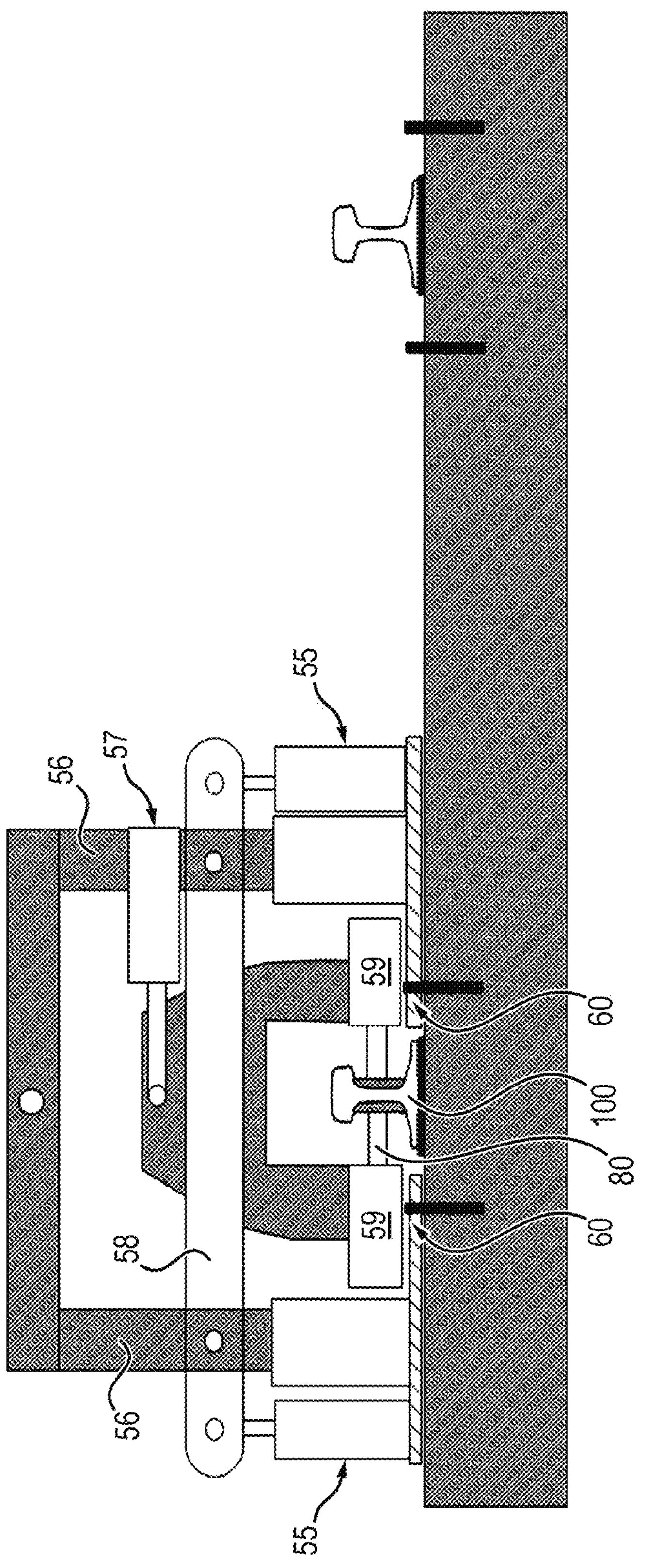
FIG. 8 shows a schematic front view of an assembly for the automatic aligning of rails according to another embodiment of the invention.

Another embodiment of an assembly for automatic aligning of rails is illustrated by way of a non-limiting example in FIG. 8.

The assembly for automatic aligning of rails comprises an actuation system 51, 52 comprising a pair of actuation cylinders 55 and an additional actuation cylinder 57.

The pair of actuating cylinders 55 comprises two actuating cylinders 55 arranged on either side of the rail 100, 200 in the transverse direction Y. The pair of actuating cylinders 55 is designed to modify a position of the rail 100, 200 both in translation in a height direction Z to align the rail 100, 200 in height position, and in rotation around the longitudinal axis to align the rail 100, 200 in inclination. Translation in the height direction Z is guided by slides 56 arranged on either side of the rail 100, 200 and extending substantially in the height direction Z of the rail.

An identical modification of the height of the two cylinders 55 causes a modification of the height of the rail 100, 200. A different modification of the height of the two cylinders 55 causes a modification of the inclination of the rail 100, 200.

The additional actuation cylinder 57 is designed to be arranged substantially above the rail 100, 200. The additional actuation cylinder 57 is designed to modify a position of the rail 100, 200 in translation in the transverse direction Y of the rail to align the rail 100, 200 in transverse position. Translation in the transverse direction Y is guided by a slide 58 designed to extend substantially above the rail 100, 200 in the transverse direction Y of the rail.

The assembly for automatic aligning of rails also comprises two clamping cylinders 59 arranged on either side of the rail 100, 200 and designed to clamp the rail 100, 200 via a jaw 80 arranged on either side of and in contact with the rail 100, 200. The actuation of the actuation cylinders 55, 57 causes the application of a force on the rail 100, 200 by means of the pair of clamping cylinders 59.

Placement of the Alignment Systems 10, 20 on the Track Elements 70

In a first exemplary embodiment, the first alignment system 10 is designed to be laid on, or wedged on the first track element 70, and the second alignment system 20 is designed to be placed on or wedged on the second track element 70.

The weight of the rails 100, 200, allows holding the alignment systems 10, 20 in place relative to the track elements 70, in particular allows blocking the alignment systems 10, 20 in the transverse direction Y.

This first exemplary embodiment can in particular be used in the case of a straight line track, i.e. when few radial forces are likely to be exerted on the alignment systems 10, 20.

In particular, when the track elements 70 are sleepers, the alignment systems 10, 20, can be designed to be laid on, or wedged on the respective sleepers 70, on either side of the respective rails 100, 200.

In a second exemplary embodiment, the first alignment system 10 is designed to be removably attached to the first track element 70, and the second alignment system 20 is designed to be removably attached to the second track element 70.

More particularly, each alignment system 10, 20 can comprise at least one hook 60 designed to be removably attached to at least one corresponding hook of the track element 70.

This second exemplary embodiment can in particular be used in the case of a curved track, i.e. when considerable radial forces are likely to be exerted on the alignment systems 10, 20.

The hook 60 can be designed to be arranged in a lower portion of a structure element 53, 54 of the alignment system 10, 20.

Each alignment system 10, 20 can comprise two hooks 60 designed to extend on either side of the rail 100, 200 at which the alignment system 10, 20 is located, in a substantially symmetrical manner relative to the plane of symmetry of the rail, facing two corresponding hooks of the track element 70. Thus the alignment system 10, 20 is attached to the track element 70 by means of two hooks 60.

The at least one hook 60 of the alignment system 10, 20 can comprise a plate 71 designed to be attached to a corresponding hook of the track element 70. Said plate 71 can comprise several different means of attachment designed to provide attachment of the plate 71 to several different types of hooks of the track element 70. Thus, the alignment system 10, 20 can be attached to track elements 70 having hooks of different types. The alignment assembly thus has considerable modularity, and can be adapted to different types of tracks.

In particular, the track element 70 can be a track sleeper. The track sleeper 70 can have different types of hooks, for example a hook of the lag bolt type, of the threaded rod type, or of the clip type.

The adjustment plate 71 can comprise:

first means of attachment to a hook of the lag bolt type or of the threaded rod type of the track sleeper 70, second means of attachment to a hook of the clip type of the track sleeper 70, and third attachment means to the alignment system 10, 20.

The adjustment plate 71 of the alignment system 10, 20 thus allows attachment to a track sleeper 70 comprising a hook of the lag bolt, threaded rod or clip type. The alignment system 10, 20 can thus be attached to a majority of existing track sleepers 70.

Depending on the type of hook of the track sleeper 70, the first attachment means and/or the second attachment means of the plate 71 are arranged in contact with the corresponding hook of the track sleeper 70. The plate 71 can be able to be turned to place the desired attachment means in contact with the track sleeper 70.

FIGS. 4*a*, 4*b*, 5*a*, 5*b*, 6*b* and 7*b* show by way of a non-limiting example an attachment of the plate 71 to a track sleeper 70 hook of the lag bolt type or threaded rod type. The first attachment means of the plate 71 can comprise a through opening 73 designed to extend facing a corresponding opening drilled in the track sleeper 70. The through opening 73 can have shapes and dimensions designed to extend around a threaded rod of the track sleeper 70, and/or to receive a lag bolt.

Figure 5A:
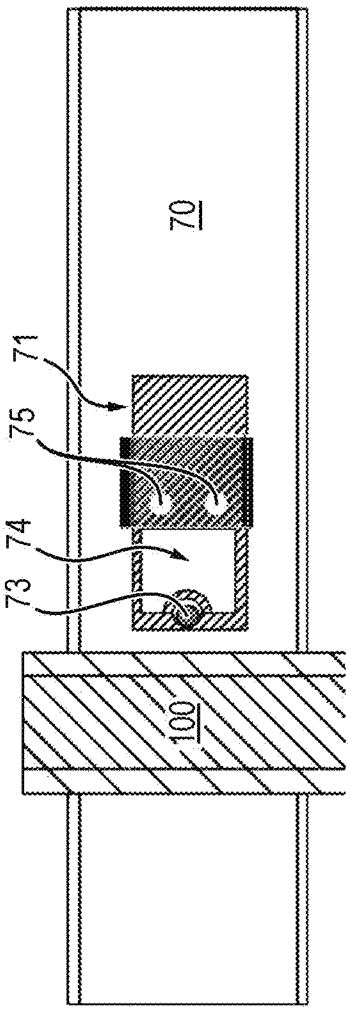
FIGS. 5*a* and 5*b* show schematic top views of an attachment of an assembly for automatic aligning of rails according to one embodiment of the invention to a track sleeper hook of the lag bolt type or of the threaded rod type, for different transverse positions of the track sleeper hook.
Figure 5B:
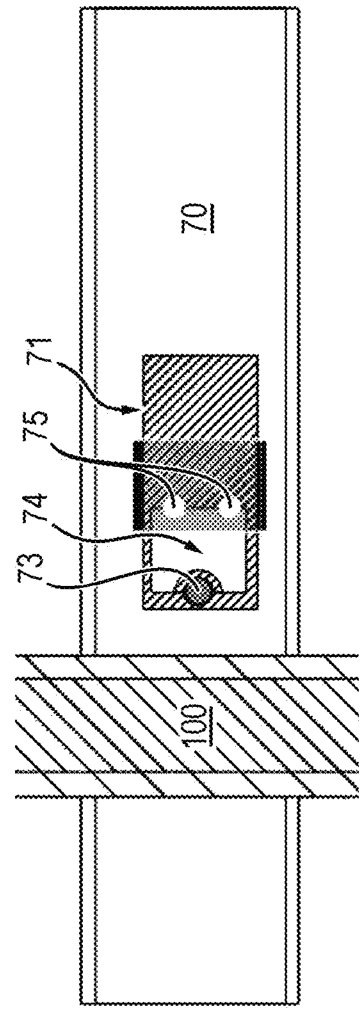
Figure 5C:
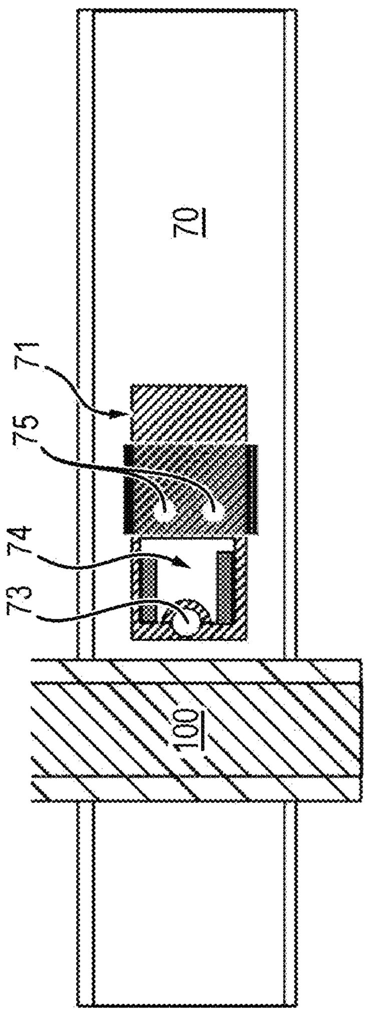
FIG. 5*c* shows a schematic top view of an attachment of an assembly for automatic aligning of rails according to one embodiment of the invention to a track sleeper hook of the clip type.
Figure 6A:
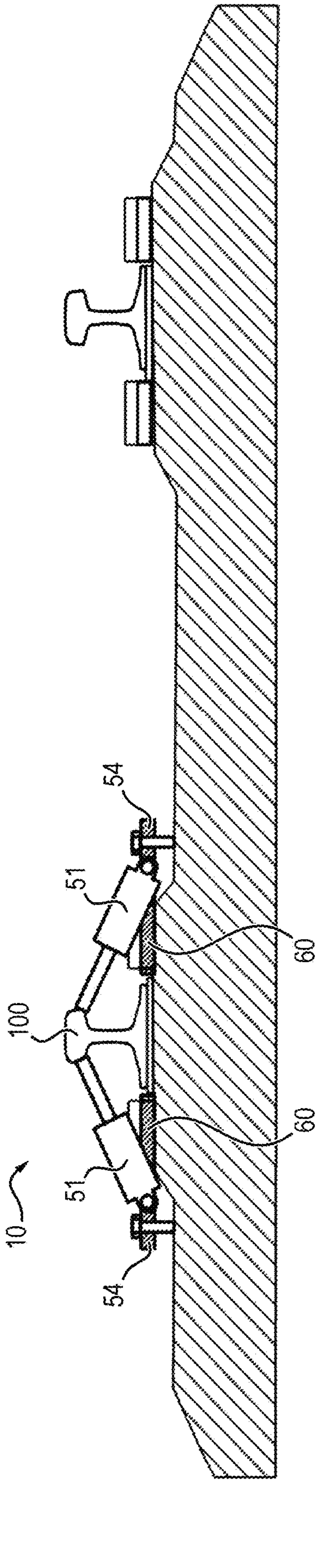
FIGS. 6*a* and 6*b* show schematic front views of an attachment of an assembly for automatic aligning of rails according to one embodiment of the invention respectively to a track sleeper hook of the clip type and to a hook of the lag bolt type.
Figure 6B:
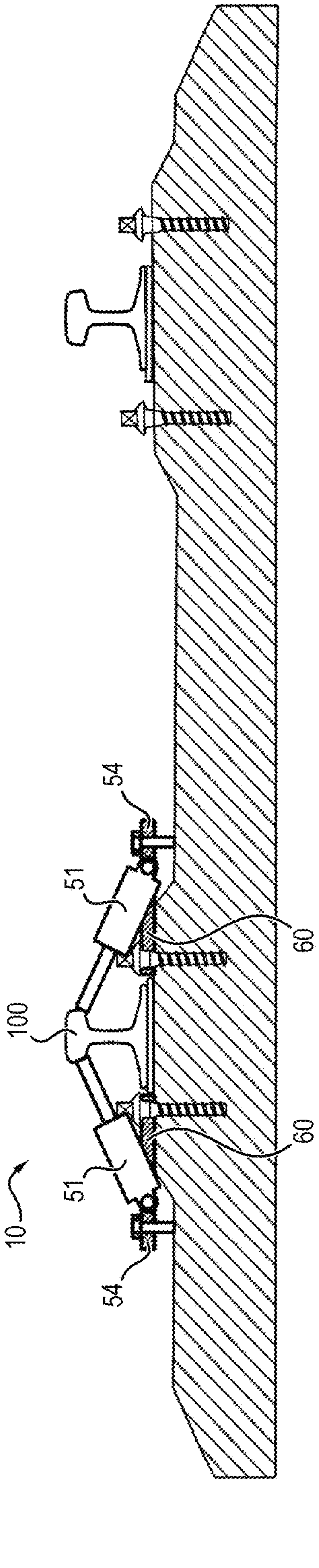
Figure 7B:
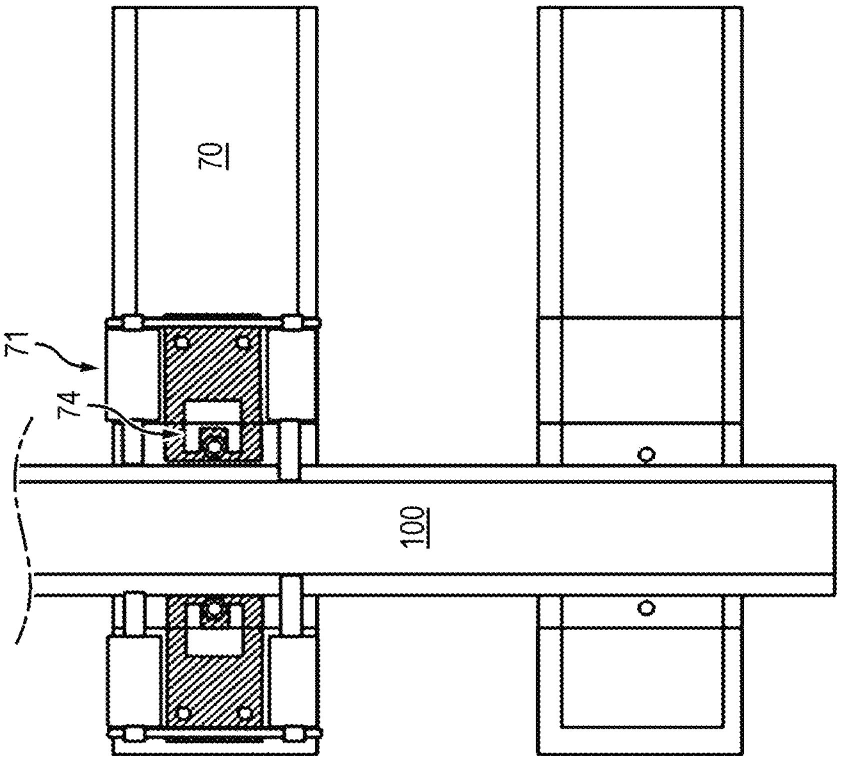
FIGS. 7*a* and 7*b* show schematic top views of an attachment of an assembly for automatic aligning of rails according to one embodiment of the invention respectively to a track sleeper hook of the clip type and to a hook of the lag bolt type.
Figure 7A:
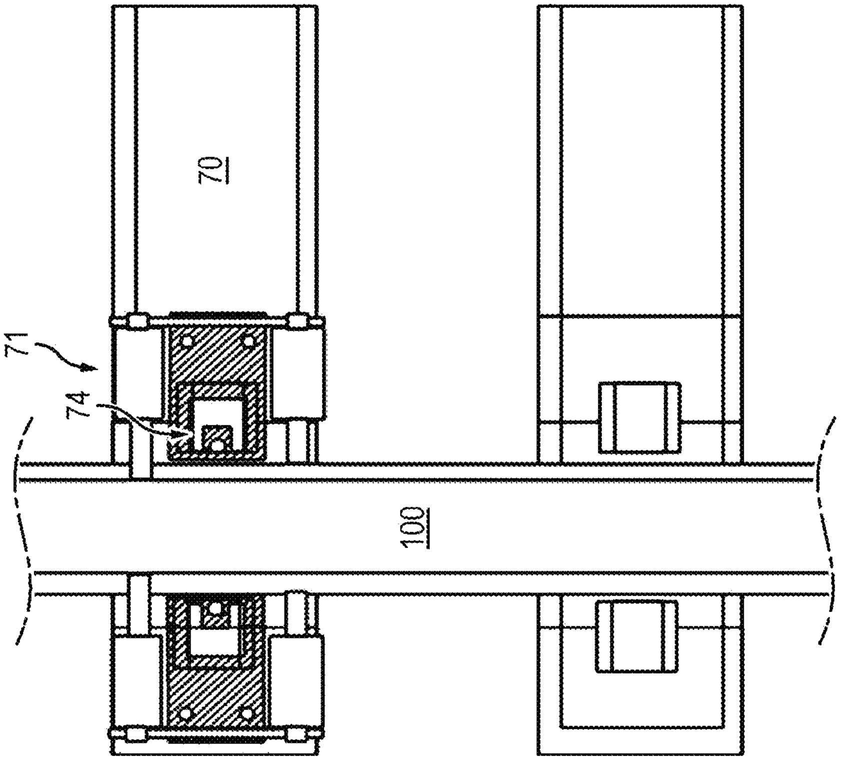

FIGS. 5*c*, 6*a* and 7*a* show by way of non-limiting examples an attachment of the plate 71 to a track sleeper 70 hook of the clip type. The second attachment means of the plate 71 can comprise a through aperture 74 designed to extend around a clip of the track sleeper 70. The aperture 74 of the plate 71 can be substantially rectangular, as illustrated in FIGS. 5*c*, 6*a* and 7*a*. As a variant, the second attachment means of the plate 71 can comprise a tab designed to be put into contact with the rail 100, 200 when the plate 71 is laid on the track sleeper 70. The tab comprises attachment means designed to attach the tab to the rail 100, 200. For example, the tab can be articulated in rotation relative to the plate 71 by means of a hinge, so that once the plate 71 is laid on the track sleeper 70, the tab can be actuated in rotation to come into contact with the corresponding rail 100, 200. The tab can have clipping means designed to clip the tab to the rail 100, 200 once the tab is in contact with the rail 100, 200.

A distance in the transverse direction Y from the track sleeper 70 hook to the rail 100, 200, i.e. a distance between centers of the track sleeper 70 hook, is likely to vary depending on the type of track sleeper 70. The adjustment plate 71 can comprise a means of adjusting the distance between centers 75 allowing adaptation to different transverse distances from the track sleeper 70 to the rail 100, 200.

The means of adjusting the distance between centers 75 can be arranged in proximity to the third means of attachment of the plate 71. The means of adjusting the distance between centers 75 can consist of at least one, for example two, screws for adjusting the distance between centers.

FIGS. 5*a* and 5*b* illustrate by way of a non-limiting example two examples of an adjusting plate 71 of an alignment system 10, 20 placed on two track sleeper 70 hooks of the lag bolt type or of the threaded rod type having different distance between centers, by means of two screws for adjusting the distance between centers 75. The track sleeper 70 hook of FIG. 5*a* is arranged closer to the rail 100, 200, i.e. has a smaller distance between centers, than the track sleeper 70 hook of FIG. 5*b*.

Control System

The alignment assembly can include a control system designed to control actuation of the actuation systems 51, 52 of the alignment system depending on a position measured by the acquisition system 30.

The control system can comprise a control unit designed to supply a command for actuating the actuation systems 51, 52 of the alignment assembly depending on a position measured by the acquisition system 30. The control unit comprises a processor designed to calculate, based on the position measured by the acquisition system 30, a command for actuating the actuation systems 51, 52, more particularly of each cylinder of the alignment assembly, for the purpose of aligning the rails 100, 200.

The control system can comprise a hydraulic unit, an electric motor or a battery designed to move one or more cylinders.

The control system can be designed to be unloaded on the track with the rest of the alignment assembly, or be designed to remain in a transport system of the alignment assembly on the track.

Method for Automatic Aligning of Rails

A method for automatic aligning of rails by means of an assembly for automatic aligning of rails of the type described above comprises the following steps:

placement of the first alignment system 10 on the first track element 70;

placement of the second alignment system 20 on the second track element 70;

acquisition of a position of the first rail 100 and/or of the second rail 200 by means of the system for acquiring a position 30;

automatic adjustment of a position of the first rail 100 and/or of the second position 200 by means of the first actuation system 51, 52 and/or of the second actuation system 51, 52, so as to align the first rail 100 and the second rail 200.

The method described allows automatically aligning the rails 100, 200 by means of a device having reduced weight and bulk.

The step of acquiring a position can be preceded by a step of placing the system for acquiring a position 30, in particular of each of the rulers 31 of the acquisition system 30, on the two rails 100, 200.

The alignment of the rails 100, 200 can be followed by a step of welding the rails 100, 200, for example by thermite welding.

Other embodiments can be contemplated, and a person skilled in the art can easily modify the embodiments or exemplary embodiments disclosed above or contemplate others, while still remaining within the scope of the invention.

The invention claimed is:

1. An assembly for automatic aligning of rails, comprising:

a first alignment system designed to be placed on a first track element at a first rail;

a second alignment system designed to be placed on a second track element at a second rail without a structural connection between the first and second alignment systems; and an acquisition system designed to be placed on the first or second track element separate from the first and second alignment systems, comprising at least one position sensor for measuring a position of at least one of the first rail and of the second rail, wherein the first alignment system comprises a first actuation system designed to adjust a position of the first rail depending on a position measured by the acquisition system and/or the second alignment system comprises a second actuating system designed to automatically adjust a position of the second rail depending on a position measured by the acquisition system.

2. The assembly for automatic alignment of rails according to claim 1, wherein the acquisition system is designed to measure a relative position of the first rail and of the second rail with respect to one another.

3. The assembly for automatic alignment of rails according to claim 1, wherein each actuation system comprises at least a pair of actuation cylinders comprising two cylinders, each cylinder of the pair of actuation cylinders being designed to extend on a respective side of the rail, the position of which is to be adjusted, and to move said rail for the purpose of its alignment.

4. The assembly for automatic alignment of rails according to claim 3, wherein each actuation system comprises a pair of cylinders for actuation in translation designed to move said rail in translation along a rail transverse direction and/or along a rail height direction.

5. The assembly for automatic alignment of rails according to claim 4, wherein each of the two cylinders of the pair of cylinders for actuation in translation in translation is designed to be positioned in contact with a rail head on a respective side of the rail head.

6. The assembly for automatic alignment of rails according to claim 3, wherein each actuation system comprises a pair of cylinders for actuation in rotation designed to varying an inclination of said rail around a rail longitudinal direction.

7. The assembly for automatic alignment of rails according to claim 3, wherein each alignment system comprises a single structure element in the form of a rigid frame designed to extend on either side of the rail, the position of which is to be adjusted, wherein each cylinder of the at least one pair of actuation cylinders is mounted on the single structure element.

8. The assembly for automatic alignment of rails according to claim 3, wherein each alignment system comprises two distinct structure elements, each structure element being designed to extend on a respective side of the rail, the position of which is to be adjusted, wherein each cylinder of the at least one pair of actuation cylinders is mounted on a respective structure element.

9. The assembly for automatic alignment of rails according to claim 1, wherein each alignment system comprises at least one hook designed to be removably attached to at least one corresponding hook of the track element.

10. The assembly for automatic alignment of rails according to claim 9, wherein the at least one hook of the alignment system comprises a plate designed to be attached to a corresponding hook of the track element, said plate being adjustable depending on a type of said hook of the track element.

11. The assembly for automatic alignment of rails according to claim 10, wherein the track element is a track sleeper, and wherein the plate comprises:

a first attachment system for attaching the plate to a hook of the lag bolt type or of the threaded rod type of the track sleeper, a second attachment system for attaching the plate to a hook of the clip type of the track sleeper, and a third attachment system for attaching the plate to the alignment system.

12. A method for automatic aligning of rails using an assembly for automatic aligning of rails according to claim 1, comprising: placing the first alignment system on the first track element; placing the second alignment system on the second track element;

acquiring a position of the first rail and/or of the second rail by the acquisition system;

automatically adjusting a position of the first rail and/or of the second rail by the first actuation system and/or the second actuation system, so as to align the first rail and the second rail.

13. The assembly for automatic alignment of rails according to claim 1, wherein the acquisition system is configured to be placed between the first and second alignment systems.

14. The assembly for automatic alignment of rails according to claim 1, wherein the acquisition system includes a first portion and a second portion configured to be placed on the first track element and second track element, respectively.

15. An assembly for automatic aligning of rails, comprising:

a first alignment system designed to be placed on a first track element at a first rail;

a second alignment system designed to be placed on a second track element at a second rail; and an acquisition system, comprising at least one position sensor for measuring a position of at least one of the first rail and of the second rail, wherein the first alignment system comprises a first actuation system designed to adjust a position of the first rail depending on a position measured by the acquisition system and/or the second alignment system comprises a second actuating system designed to automatically adjust a position of the second rail depending on a position measured by the acquisition system, and wherein each actuation system comprises at least a pair of actuation cylinders comprising two cylinders, each cylinder of the pair of actuation cylinders being designed to extend on a respective side of the rail, the position of which is to be adjusted, and to move said rail for the purpose of its alignment.

16. An assembly for automatic aligning of rails, comprising:

a first alignment system designed to be placed on a first track element at a first rail;

a second alignment system designed to be placed on a second track element at a second rail; and an acquisition system, comprising at least one position sensor for measuring a position of at least one of the first rail and of the second rail, wherein the first alignment system comprises a first actuation system designed to adjust a position of the first rail depending on a position measured by the acquisition system and/or the second alignment system comprises a second actuating system designed to automatically adjust a position of the second rail depending on a position measured by the acquisition system, and wherein each alignment system comprises at least one hook designed to be removably attached to at least one corresponding hook of the track element.

* * * * *